United States Patent
Kurt et al.

(10) Patent No.: US 7,721,410 B2
(45) Date of Patent: May 25, 2010

(54) MACHINE TOOL COMPRISING A CLAMPING DEVICE ON BOTH SIDES

(75) Inventors: Hans Ulrich Kurt, Kriegstetten (CH); Rudolf Heid, Luterbach (CH); Herbert Wirz, Zuchwil (CH)

(73) Assignee: Gudel Group AG, Langenthal (CH)

( * ) Notice: Subject to any disclaimer, the term of this patent is extended or adjusted under 35 U.S.C. 154(b) by 939 days.

(21) Appl. No.: 10/559,241

(22) PCT Filed: May 25, 2004

(86) PCT No.: PCT/CH2004/000315

§ 371 (c)(1),
(2), (4) Date: May 18, 2006

(87) PCT Pub. No.: WO2004/108349

PCT Pub. Date: Dec. 16, 2004

(65) Prior Publication Data

US 2006/0236515 A1 Oct. 26, 2006

(30) Foreign Application Priority Data

Jun. 4, 2003 (EP) .................................. 03405405

(51) Int. Cl.
*B23C 1/12* (2006.01)
*B23C 1/027* (2006.01)

(52) U.S. Cl. .................. 29/560; 409/235; 409/158; 409/211; 409/201; 408/236

(58) Field of Classification Search .................. 409/235, 409/158, 192, 203, 213, 217, 201, 211, 216; 408/34, 234, 236; 29/560, 26 A, 564, 33 P, 29/563; *B23C 1/12, 1/027*

See application file for complete search history.

(56) References Cited

U.S. PATENT DOCUMENTS 2,750,851 A * 6/1956 Berthiez ...................... 409/211
3,460,435 A * 8/1969 Dahl et al. ................... 409/183
4,984,351 A    1/1991 Matsuyama et al.
5,346,343 A * 9/1994 Babel ......................... 409/201
6,067,695 A * 5/2000 Momoitio ..................... 409/203
6,233,810 B1   5/2001 Asbeck
2009/0123246 A1* 5/2009 Matsui ........................ 409/201

FOREIGN PATENT DOCUMENTS

| DE | 298 01 236 U1 | | 4/1998 |
| EP | 1 055 485 A2 | | 11/2000 |
| EP | 1600269 A1 | * | 11/2005 |
| FR | 2474365 A | * | 7/1981 |
| JP | 02232109 A | * | 9/1990 |
| WO | WO-02/094500 A1 | | 11/2002 |

\* cited by examiner

*Primary Examiner*—Erica E Cadugan
(74) *Attorney, Agent, or Firm*—Birch, Stewart, Kolasch & Birch, LLP

(57) ABSTRACT

The invention relates to a machine tool (1) comprising a machine tower (2) which can be displaced in a linear manner along a straight track (13), a tool head (4) which is arranged on the machine tower (2) and a tool (5) which is used to process work pieces. A first mounting device (25) is arranged on a first side of the straight track (13) and a second mounting device (26) is arranged on the other side of the straight track (13) which is opposite the first side. The tool head (4) can be positioned in such a manner that it can selectively process a first work piece in the first mounting device (25) or a second work piece in the second mounting device (26). Initially, the first work piece is mounted in the first mounting device for processing, and the tool head is positioned in such a manner that the first work piece can be processed. During processing, the second work piece is mounted in the second mounting device. When the first work piece has been processed, the tool head is positioned in such a manner that the second work piece can be processed. As a result, it is possible to arrange two long work pieces independently from each other in a processing position. The stoppage time when the work pieces are changed reduces due to the new position of the tool head and is significantly reduced in relation to the stoppage time in common tool machines.

18 Claims, 5 Drawing Sheets

MACHINE TOOL COMPRISING A CLAMPING DEVICE ON BOTH SIDES

TECHNICAL FIELD

The invention relates to a machine tool with a machine tower, which is linearly displaceable along a straight track, with a tool head, which is arranged on the machine tower and comprises a tool for machining workpieces, and with at least two work-holding devices for at least two workpieces. The invention also relates to a method for machining at least two workpieces with a machine tool which is displaceable along a straight track.

PRIOR ART

As a rule, a number of workpieces are machined one after another with a machine tool. After all the machining steps have been carried out on a first workpiece, it is removed from a work-holding device which holds the workpieces in such a way that they can be machined by the machine tool. A new workpiece to be machined is then clamped into the work-holding device, after which its machining can begin. Exchanging the workpieces leads to a certain idle time in which the machine tool cannot carry out machining. Especially in the case of large or heavy workpieces and also with types of machining which necessitate complicated clamping, the idle time can be considerable and greatly reduce the capacity of the machine tool.

U.S. Pat. No. 4,984,351 (Brother) discloses a machine tool, which is linearly displaceable along a straight track, with a vertically movable spindle. At least two tables, which are horizontally displaceable at right angles to the track independently of one another, are arranged next to one another along one side of the track. One large workpiece can be fastened on the tables together or a number of small workpieces can be fastened on the tables individually. If smaller workpieces are being machined, the tables allow one table to be loaded while a workpiece is already being machined on another table. In this way, the idle time can be minimized.

If large workpieces, for example long workpieces which have to be clamped with their greatest extent parallel to the straight track, are to be machined, all the tables are used for fastening such a workpiece. In this case, the usual idle times occur when the current workpiece is exchanged for the next.

DE 298 01 236 U (DS Technologie Werkzeugmaschinen GmbH) describes a machine tool for cutting machining of large (in particular long) components, for example of aircraft integral components made of aluminum alloys. The machine comprises a column which is linearly movable between a machine bed and an upper guide along a straight track, on which column a machining head, which is movable along a number of axes, is arranged at the side. At least one foldable clamping table is arranged along the track. For machining by means of the clamping table, the workpieces are brought out of a horizontal preparation position into a vertical machining position. If a number of clamping tables independent of one another are provided next to one another, one workpiece can be machined while a finished machined workpiece is exchanged for a new workpiece in the horizontal workpiece change position of the clamping table. Dead times can thus be avoided.

If a long workpiece is being machined, all the clamping tables are occupied by it. In this case too, workpiece change therefore again takes place in the conventional manner while the machine tool is idle. A reduction of the idle times and thus an increase in the capacity is not possible with large workpieces.

DESCRIPTION OF THE INVENTION

It is an object of the invention to provide a machine tool belonging to the technical field referred to in the introduction with increased capacity.

The solution for achieving the object is defined by the features of the present invention. According to the invention, a first of the work-holding devices is arranged on a first side of the straight track, and a second of the work-holding devices is arranged on a second side of the straight track, which lies opposite the first side. The tool head can be positioned in such a way that it can alternatively machine a first of the at least two workpieces in the first work-holding device or a second of the at least two workpieces in the second work-holding device.

The arrangement of two work-holding devices on the two sides of the straight track and the corresponding positionability of the tool head afford a possibility of arranging two long workpieces in machining positions independently of one another. As long as one of the workpieces is being machined on one side of the track, the workpiece on the other side of the track can be exchanged or repositioned for further machining steps. As soon as the machining of the first workpiece has been carried out, the tool head can be repositioned and the machining of the second workpiece can begin immediately. The idle time is limited to the repositioning of the tool head and is negligible compared with the dead time when a large workpiece is exchanged.

The machine tower is advantageously rotatable by at least 180° about a vertical axis. By virtue of this, a tool head arranged on the machine tower changes its position and orientation in such a way that the workpiece on in each case the other side can be machined. Both workpieces can be reached symmetrically by the same tool head in the same way. This design makes machining of an opposite workpiece possible independently of the movability of the tool head and guarantees good support of the tool head. It is advantageous especially when the machine head is guided along a considerable part of the machine tower, for example in order that it can be displaced vertically. If machining steps, such as drilling or cutting for example, are advantageously carried out in the axial direction of the tool head, the machine tool can also be designed in such a way that the machining can take place when the machine tower occupies an intermediate position between 0° and 180° or is rotated by more than 180°.

Otherwise, it is also possible for only an upper part of the machine tower, on which the tool head is arranged and guided, to be rotatable by 180° about a vertical axis.

Alternatively, the tool head can be pivotable by at least 180° about a horizontal axis. If the tool head works along a horizontal axis or is movable symmetrically in relation to a horizontal axis, such a pivoting movement about a horizontal axis parallel to the straight track likewise makes the machining of workpieces on both sides of the straight track possible. Since the entire machine tower does not have to be rotated during repositioning of the tool head, the mass to be moved is greatly reduced. If machining steps, such as drilling or cutting for example, are advantageously carried out in the axial direction of the tool head, the machine tool can also be designed in such a way that the machining can take place when the tool head occupies an intermediate position between 0° and 180° or is pivoted by more than 180°.

The tool head advantageously has cartesian kinematics and is in particular arranged on the machine tower in such a way that it is rotatable about three rotational axes perpendicular to one another. Such a tool head affords maximum possible flexibility because it can occupy any orientation in relation to the workpiece. The positionability of the tool head is brought about by displacement along the straight track, which defines an X axis, and also if appropriate by vertical displacement (Z direction) along the machine tower and by horizontal displacement transversely to the X axis (Y direction) if the tool head is arranged on a correspondingly movable bracket.

If lighter work is to be carried out, the machine tower is advantageously mounted in a free-standing manner on a guide which corresponds to the straight track. Lighter work includes in particular drilling, broaching, riveting, screwing, hardening or welding, during which the torque arising owing to the force between tool head and workpiece can easily be transmitted downward from the machine tower to the guide. The guide is a rail, for example, on which the machine tower is mounted movably via rollers.

For carrying out heavier work, the machine tower is preferably mounted between a lower guide which corresponds to the straight track and an upper counterguide which extends parallel to the lower guide. The considerable torques which arise during milling, deburring or cutting, for example, can thus be carried off to the two guides via the machine tower. Guidance on both sides can also be advantageous for carrying out lighter work, as the machine tower can thus be of narrower and consequently lighter design than in the case of unilateral guidance, which makes the displacement of the tower along the straight track and the rotation of the tower about its vertical axis easier. The improved dynamics result in smaller delays during rotation or displacement of the machine tower.

A method for machining at least two workpieces, in particular with a machine tool as described above which is displaceable along a straight track, comprises the following steps:
a) clamping a first of the at least two workpieces into a first work-holding device on a first side of the straight track;
b) positioning a tool head of the machine tool so that the first workpiece can be machined;
c) machining the first workpiece;
d) at the same time, clamping a second of the at least two workpieces into a second work-holding device on a second side of the straight track, which lies opposite the first side;
e) after completion of the machining of the first workpiece, positioning the tool head so that the second workpiece can be machined;
f) machining the second workpiece.

Provided that the removal of a finished machined workpiece and the clamping of a new workpiece requires no more time than the entire machining of a workpiece, the idle time of the machine tool is reduced to step e), which can take place very quickly. The repositioning takes place in particular by rotating the machine tower by 180° about a vertical axis or by pivoting the tool head by 180° about a horizontal axis.

A machine tool of the type described above, which comprises a machine tower, which is linearly displaceable along a first straight track, and also a tool head, which is arranged on the machine tower and comprises a tool head for machining workpieces, and with a work-holding device for a workpiece at the side of the first straight track, can comprise means for moving the machine tower onto a second straight track on an opposite side of the work-holding device in relation to the first straight track. The tool head can be positioned in such a way that it can machine the workpiece on both sides. By virtue of the fact that the workpiece can be machined on both sides with the same machine tower, the same tool head and the same tool, no second machine tower on the second side of the workpiece is required. The corresponding machine tool is therefore of more simple construction and more cost-effective. Such a machine tool is advantageous especially in the case of long workpieces, which cannot be rotated in relation to the machine tower in such a way that both longitudinal sides can be reached by the tool.

The machine tool advantageously comprises a slide for moving the machine tower from the first straight track to the second straight track. Such a slide takes the machine tower at one end of the first straight track, for example, transports it transversely to the track direction, past the workpiece at the side, to the second straight track and delivers it to the second straight track. This leads to the tool head being directed away from the workpiece for the time being. By means of a machine tower which is rotatable by 180° about a vertical axis or a tool head which is pivotable by 180° about a horizontal axis as indicated above, it is made possible in a simple way to align the tool head in such a way that the second side of the workpiece can be machined. In comparison with guiding the machine tower around the workpiece in a U shape, for example, a considerable space-saving is achieved especially in the case of narrow workpieces.

Further advantageous embodiments and feature combinations of the invention emerge from the detailed description below and the entirety of the patent claims.

BRIEF DESCRIPTION OF THE DRAWINGS

In the drawings used for explanation of the illustrative embodiment.

In principle, identical parts are provided with the same reference numbers in the figures.

WAYS OF EMBODYING THE INVENTION

Figure 1:
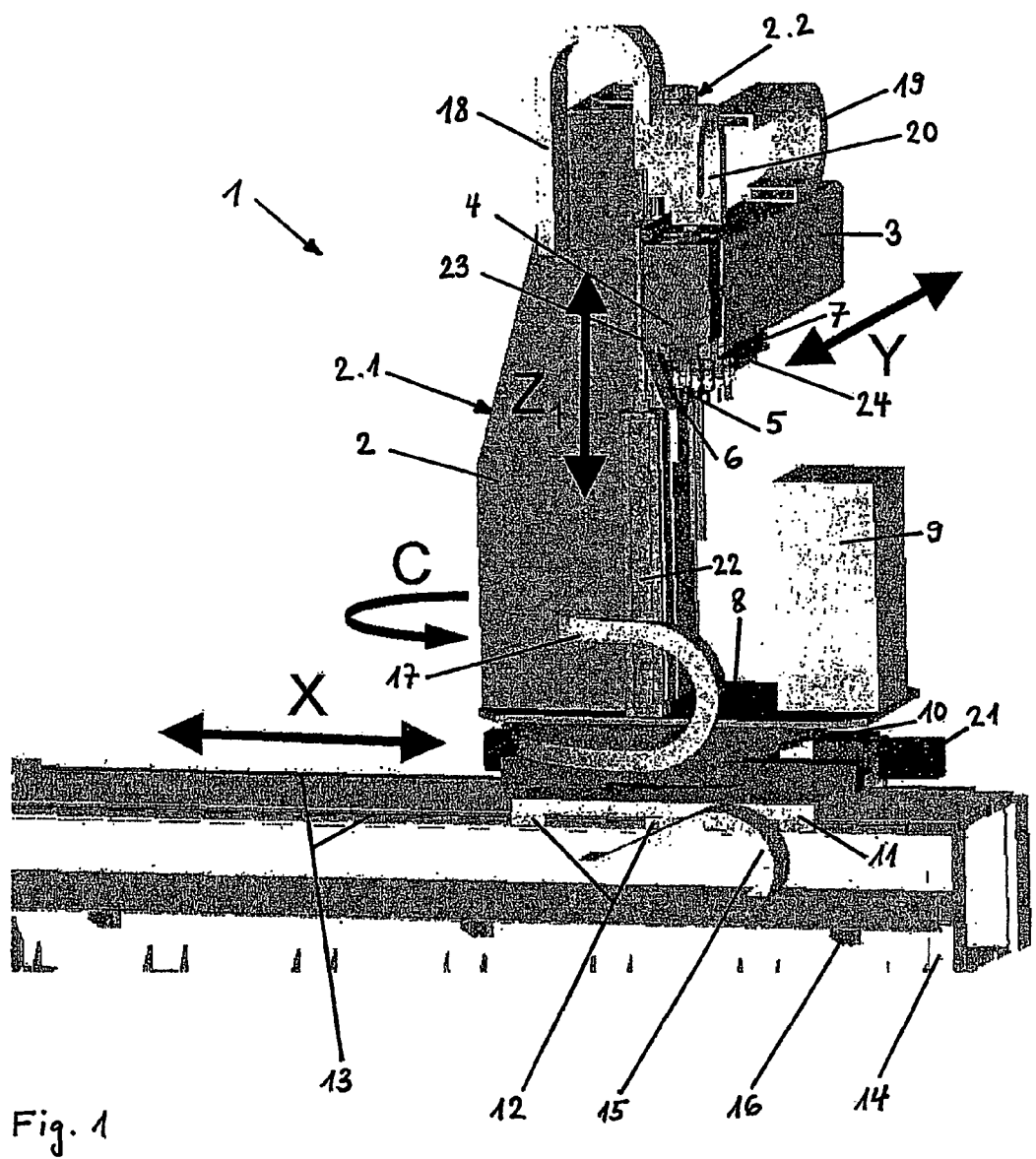
FIG. 1 shows a perspective view of a machine tool according to the invention with a rotatable machine tower.

FIG. 1 shows a machine tool according to the invention. The machine 1 comprises a vertical machine tower 2 which has an essentially rectangular cross section which tapers upward, the rear side 2.1 extending at an angle in the upper part. A tool slide 3, which bears at one of its ends a tool 4 with a drilling head 5, is arranged on the front side 2.2 of the machine tower 2. The drill of the drilling head 5 is oriented vertically downward and can consequently produce vertical bores. The tool slide 3 is mounted horizontally displaceably along an axis Y on a carrier plate 6 which in turn is mounted vertically displaceably along an axis $Z_1$ on the front side 2.2 of the machine tower 2. To this end, the carrier plate 6 comprises rails on its rear side which are guided in corresponding grooves on the front side 2.2 of the machine tower 2.

The tool 4 is vertically movable on rails 7 along the axis $Z_2$ in relation to the tool slide 3. By virtue of this, movement of the entire tool slide 3 along the machine tower is avoided when small positional changes take place. The drilling head 5 moreover comprises a sprung pressing-on element, which likewise acts vertically and presses the drilling head onto the workpiece.

The machine tower 2 stands on a base plate 8, which also carries in a box 9 a hydraulic unit and also a vacuum sucker. The base plate 8 is in turn connected firmly to a rotary table 10, which is arranged on a slide 11 rotatably about a vertical rotational axis C. The slide 11 comprises guide elements 12 on the outside on its lower side, which interact with rails 13 on the upper side of a machine guide 14. This makes movement of the slide 11 and thus of the entire machine tool possible along the straight track (axis X) defined by the machine guide 14. The machine guide 14 is formed by a hollow profile, on which a flexible energy chain 15 is guided at the side in a channel 16 which extends along the entire length of the machine guide 14.

The energy chain 15 is connected to an appropriate connection arranged on the slide 11. During movement along the straight track, depending on direction, a longer or shorter section of the energy chain 15 is lifted out of the channel 16 or returned into the channel 16. The energy chain 15 contains in particular hydraulic hoses, power cables and control cables for supplying and controlling the movement of the machine tower 2, the tool slide 3 and the tool 4. Energy is transmitted on from the slide 11 to the machine tower 2 via a second energy chain 17, which is connected to hoses and cables in the interior of the machine tower 2. By virtue of its flexibility, the second energy chain 17 allows the rotary movement of the machine tower 2 about its vertical rotational axis C as the energy chain 17 can corotate accordingly and permits at least a rotation by 180°.

A further energy chain 18 forms the connection between the machine tower 2 and the carrier plate 6 of the tool slide 3 and allows vertical movement of the plate along the axis $Z_1$. Still another energy chain 19 connects the carrier plate 6 and the tool slide 3 and is flexible along the axis Y. A final energy chain 20 connects the tool slide 3 to the tool 4 movably along the axis $Z_2$.

A drive 21, which makes movement of the slide 11 along the machine guide 14 possible by, for example, interacting with a rack on the machine guide 14 via a gearwheel, is arranged on the slide 11. The rotary movement of the machine tower 2 about its vertical axis C takes place hydraulically. The horizontal and vertical movements of the tool slide 3 are controlled via NC axes. For load compensation, a pressure cylinder 22, which is connected to the carrier plate 6 for the tool slide 3 via a push rod 23, is arranged on the outer side of the machine tower 2. The tool 4 on the other hand comprises a separate drive with electric motor for the drill 5.

A tool change device 24, which allows automatic exchange of the drilling head 5 for replacement drills held available in the tool change device 24, is arranged on the lower side of the tool slide 3.

Figure 2A:
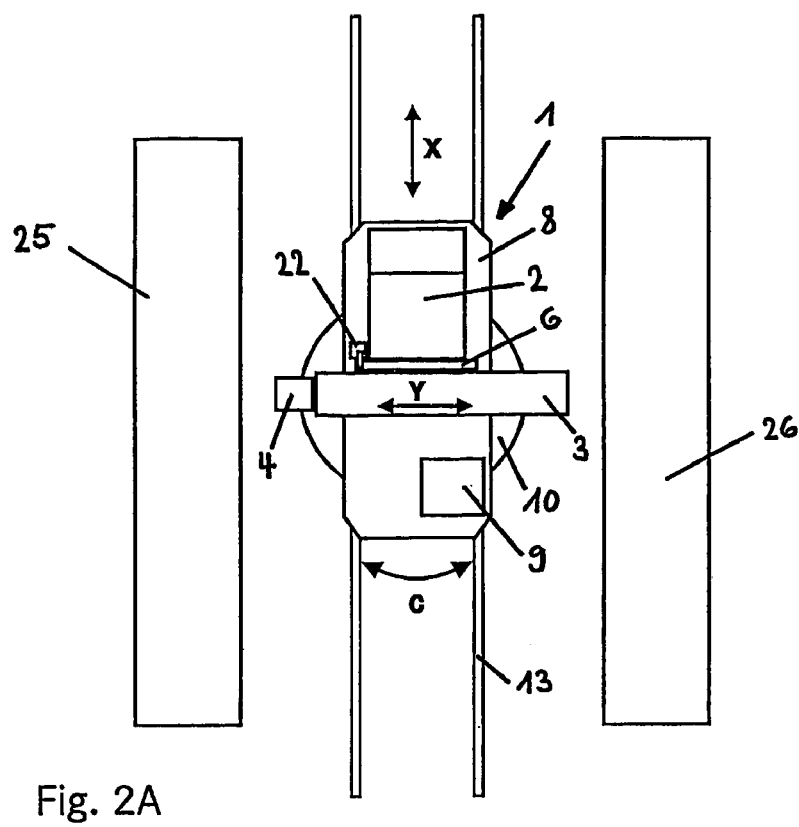
FIGS. 2A, 2B show diagrammatic illustrations of the machine tool with a rotatable machine tower and the work-holding devices.
Figure 2B:
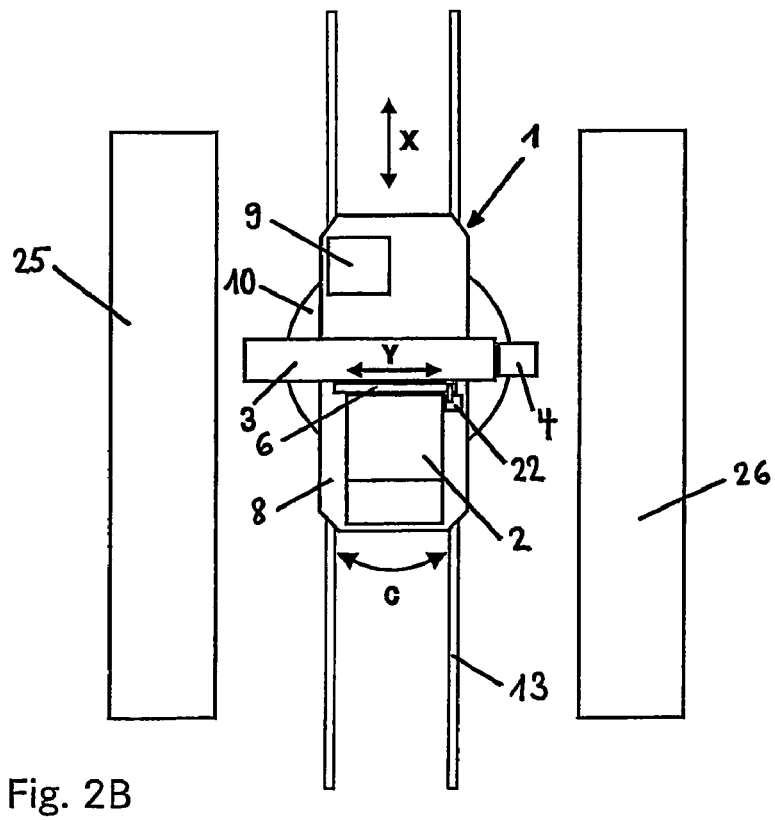

FIGS. 2A and 2B are diagrammatic illustrations of the machine tool and the work-holding devices, seen from above. The work-holding devices 25, 26 extend along the rails 13 (or the machine guide) on both sides. Their length is slightly shorter than the length of the rails 13 and selected in such a way that the tool 4 can reach the entire area of in each case one of the work-holding devices 25, 26. In FIG. 2A, the machine tower 2 is rotated in such a way that a workpiece which is clamped in the first work-holding device 25 can be machined. For machining, the tool can be raised and lowered by raising the tool slide 3 with its carrier plate 6, moved toward the workpiece and away from the workpiece by displacing the tool slide 3 in relation to the carrier plate 6 along the axis Y, and displaced along the workpiece (axis X) by displacing the entire machine tool 1 along the straight track on the rails 13.

If a workpiece is then to be machined on the second work-holding device 26, the machine tower 2 is rotated by 180° about its vertical rotational axis C by means of the rotary table 10, so that it occupies the position shown in FIG. 2B. To this end, the machine tower 2 is raised hydraulically from a lower part of the rotary table 10, rotated by 180° and set down again. Ring gears on the lower and upper part of the rotary table 10 mesh and bring about reliable fixing and rotational locking of the machine tower 2 in relation to its vertical axis.

Workpieces in both work-holding devices 25, 26 can be machined in exactly the same way; the work-holding devices are entirely equivalent. All known devices which are suitable for long workpieces, for example fixed or pivotable or movable clamping tables, pallet supports, clamping jaws etc., can be used as work-holding devices 25, 26. Their clamping surface can be arranged both vertically and horizontally or at an angle. It is also possible for different work-holding devices for receiving different workpieces to be provided on the two sides of the track.

Figure 3A:
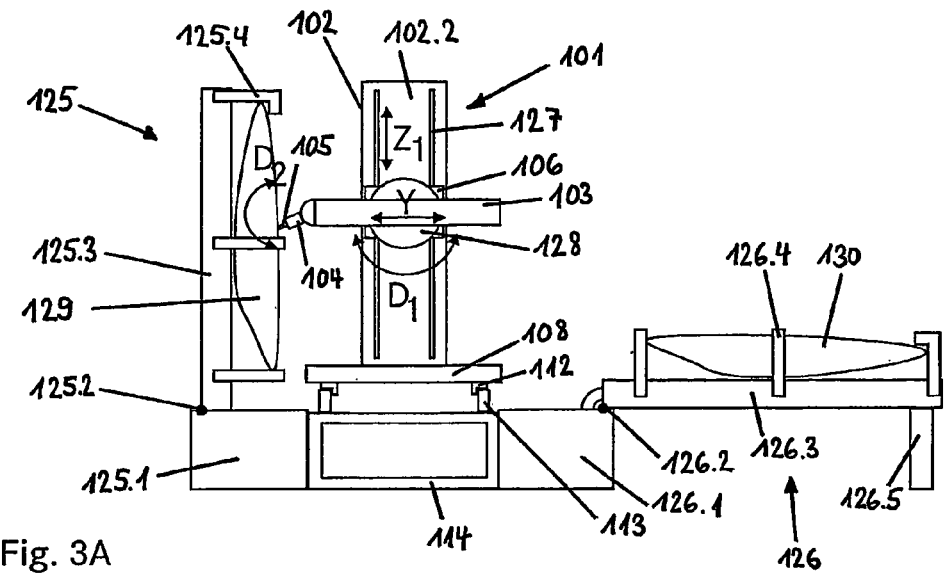
FIGS. 3A, 3B show diagrammatic illustrations of another machine tool with a pivotable tool.
Figure 3B:
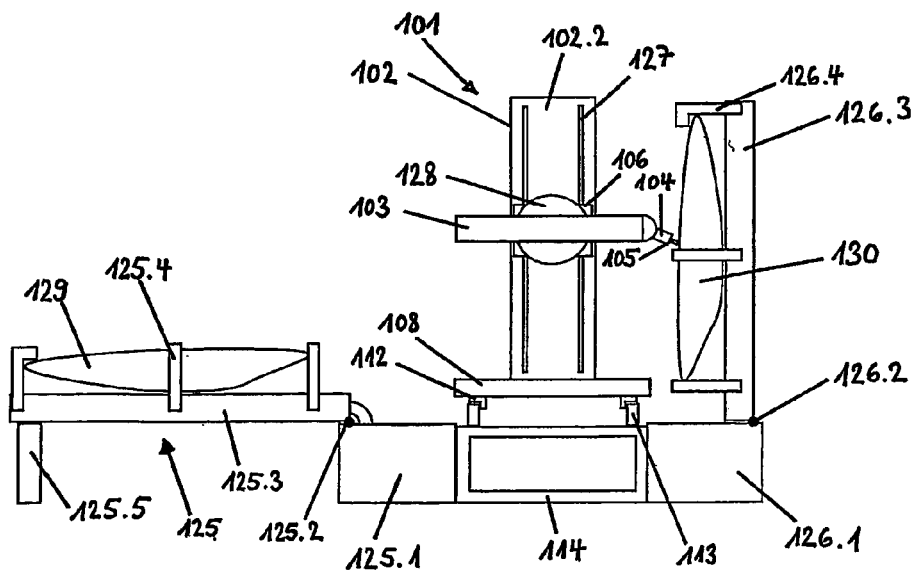

FIGS. 3A and 3B show diagrammatic illustrations of another machine tool with a pivotable tool. The machine 101 comprises a machine tower 102, which is arranged on a base plate 108. The base plate 108 comprises guide elements 112 on its lower side which interact with rails 113 arranged on the upper side of a machine guide 114 which defines a straight track. By virtue of this, the base plate 108 of the machine tool 101 can be displaced horizontally along the straight track together with the machine tower 102.

Two vertical rails 127, on which a carrier plate 106 is vertically displaceable along the axis $Z_1$, are arranged on the front side 102.2 of the machine tower 102. A rotary table 128, on which a tool slide 103 is arranged linearly displaceably (axis Y), is mounted rotatably on the carrier plate 106. The rotary table 128 is pivotable about a horizontal rotational axis $D_1$ in relation to the carrier plate 106. A tool 104 is arranged pivotably about a horizontal axis $D_2$ at one end of the tool slide 103, so that the orientation of the drilling head 105 can be varied in order that, for example, bores with different alignments are possible. The tool 104 can also be mounted on the tool slide 103 via a ball joint, so that the orientation of the drilling head 105 can be selected freely within the half-space facing the workpiece.

In FIG. 3A, a workpiece 129 which is clamped in a work-holding device 125 is being machined by the tool 104. The work-holding device 125 comprises a base plate 125.1, the upper surface of which lies roughly at the height of the machine guide 114. A vertical carrier 125.3 is arranged thereon about a horizontal rotational axis 125.2. The workpiece 129 is clamped vertically onto this carrier by means of various fastening elements 125.4.

The second work-holding device 126 is illustrated in its folded-down position in FIG. 3A. This position allows simple loading and unloading of a workpiece 130 into and from the work-holding device 126 and is brought about by folding the carrier 126.3 down about the rotational axis 126.2. In the horizontal position, the carrier 126.3 is laid onto a support 126.5 for stabilization. The foldable work-holding devices 125, 126 can be designed in such a way that they can also be fixed in an inclined position between horizontal and vertical position, so that corresponding workpieces can be machined better by the machine tool 101.

FIG. 3B shows the machining of the other workpiece 130. To this end, the second work-holding device 126 is folded up, and the tool slide 103 is pivoted by 180° about the rotational axis $D_1$ by means of the rotary table 128. By virtue of the movability of the tool 104 with the drilling head 105, it is likewise possible on the second working side to machine the second workpiece 130 while the first workpiece 129 can be removed from the first work-holding device 125 and a new workpiece clamped there.

This second machine tool 101 with pivotable tool can also be combined with a large number of different work-holding devices.

The method according to the invention is also illustrated by FIGS. 3A and 3B. For machining workpieces 129, 130 with the machine tool 101 according to the invention, a first workpiece 129 is first clamped into the first work-holding device 125. As soon as this has been done, the tool 104 can be positioned in such a way that the first workpiece 129 can be machined. While the latter is being machined, the second workpiece 130 is clamped into the second work-holding device 126 on the opposite side of the straight track. When machining of the first workpiece 129 is finished, the tool 104 is pivoted by 180° on the rotary table 128 together with the tool slide 103. This brings the tool 104 into a position in which the second workpiece 130 can be machined with it. The workpiece 129 in the first work-holding device 125 can be exchanged for a new workpiece.

Figure 4:
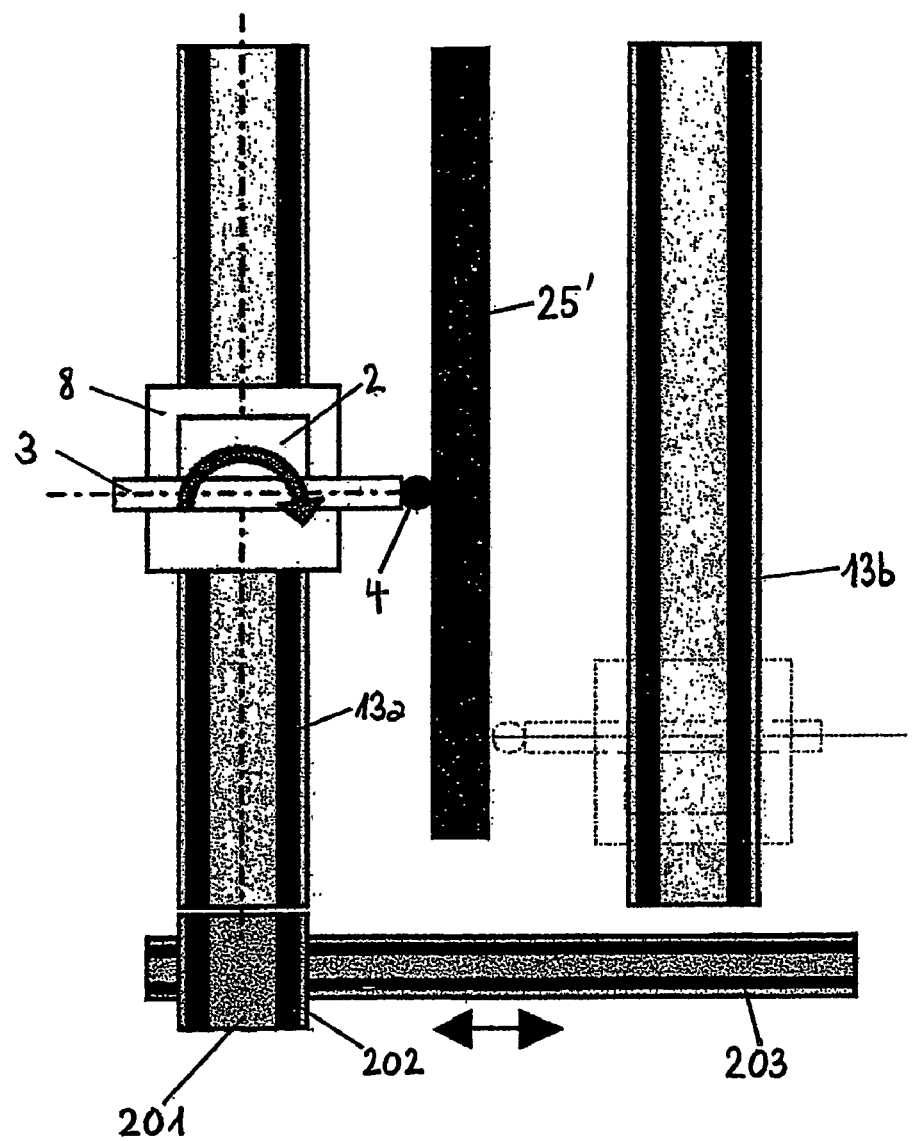
FIG. 4 shows a diagrammatic illustration of a machine tool according to the invention for machining a workpiece on both sides.

FIG. 4 is a diagrammatic illustration of a machine tool according to the invention for machining a workpiece on both sides. The machine tower 2, which is carried on the base plate 8 and comprises a tool slide 3 with a tool 4, corresponds to the machine tower which is rotatable about its vertical axis illustrated above. The machine tool is linearly displaceable along the workpiece 25' along a first straight track on rails 13a. At one end of the first track, the machine tower 2 can together with the base plate 8 be moved further onto a slide 201. To this end, the slide 201 comprises rails 202 which with regard to their shape and arrangement correspond to the rails 13a.

As soon as the machine tower 2 has been moved onto the slide 201, the slide 201 can be displaced on rails 203 transversely to the first track 13a, past the workpiece 25', to one of the ends of a second straight track, which is formed by rails 13b. The second straight track is parallel to the first track, but lies on the side opposite the workpiece. After the machine tower 2 has been received by the rails 13b of the second track, the tool slide 3 with the tool 4 faces away from the workpiece for the time being. By means of a 180° rotation of the machine tower 2 about its vertical axis, the tool 4 is therefore positioned in such a way that the second side of the workpiece 25' can be machined.

Instead of a machine tower which is rotatable by 180° about its vertical axis, the machine tool can on the other hand—as illustrated above—comprise a tool which is pivotable by 180° about a horizontal axis.

It can be seen clearly from FIG. 4 that the device illustrated requires considerably less space than a U-shaped guide for the machine tower, which leads around the (narrow) workpiece. This is because a U-shaped guide necessitates a certain minimum radius of the rails on which the machine tower is moved. This leads to a certain minimum extent in prolongation of the workpiece, which is not desired especially in the case of workpieces which are long anyway. Guiding the machine tower along a curved section is moreover constructionally more involved as it necessitates a considerably more complicated bearing arrangement of the machine tower on the rails.

The tool for machining the workpieces can have various degrees of freedom. In particular, it can be mounted on the machine tower in such a way that it is displaceable in the X, Y and Z directions and rotatable about three rotational axes perpendicular to one another. A universal head mounted in such a way can occupy all positions and orientations in relation to the machine tower within a certain range. The tool can be a broaching, milling, deburring, riveting, screwing, hardening, soldering or welding tool, laser sources or electron-beam sources also being possible, for example, for cutting, hardening or welding.

If the machine tower is to be continuously adjustable in relation to its vertical axis, an NC axis, for example, can also be provided for rotating the machine tower instead of hydraulics.

Figure 5:
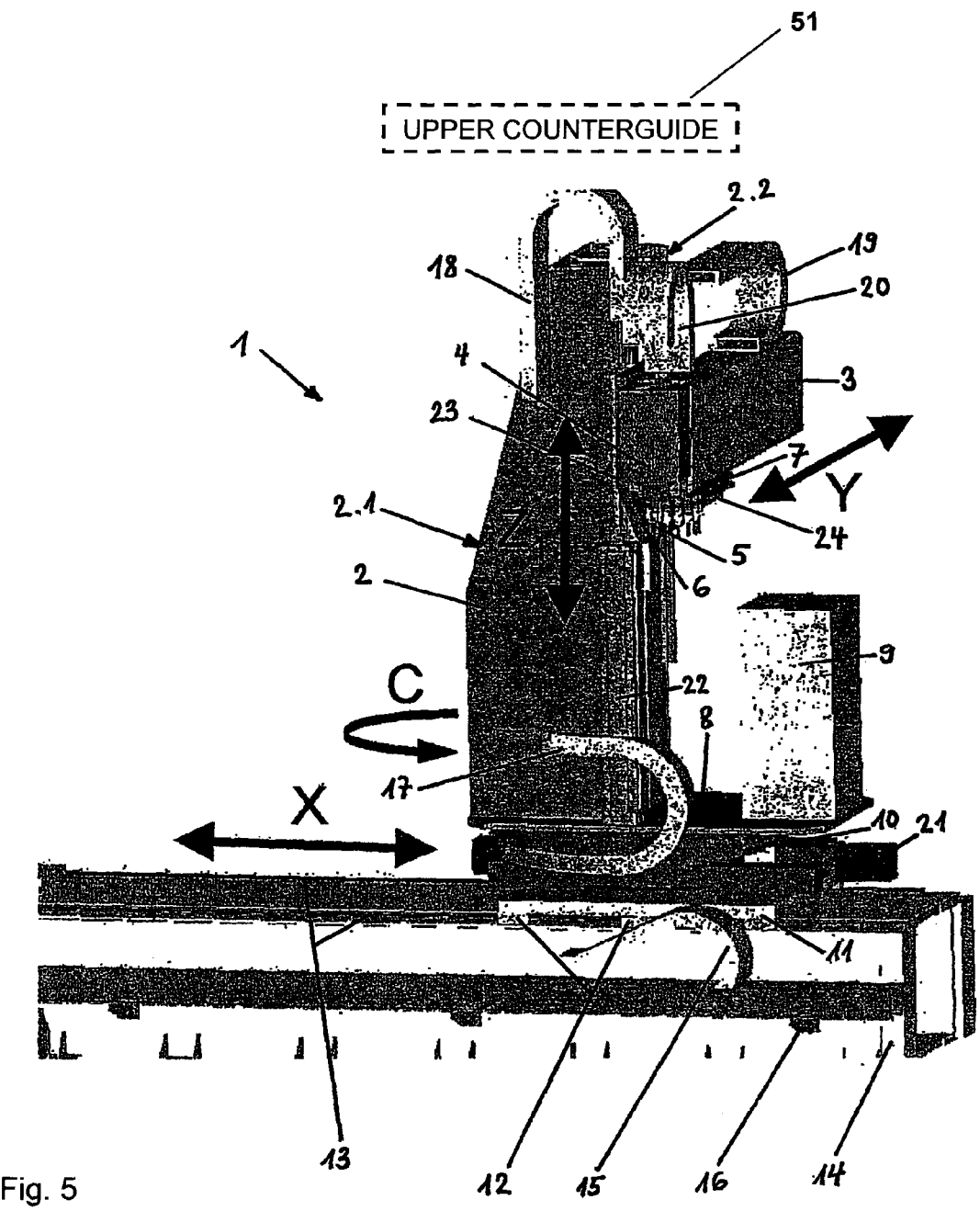
FIG. 5 shows an alternative embodiment with a schematic representation of an upper counterguide 51.

For heavy work, in which great force is transmitted between tool and workpiece, a second guide, arranged above the machine, can be provided parallel to the first machine guide, as shown in FIG. 5. In the case of a rotatable machine tower, this is also mounted rotatably in the upper guide; in the case of a pivotable tool, this is moved, for the pivoting movement, along the machine tower into a vertical area in which a collision with neither the lower nor the upper guide occurs.

The machine tool can be arranged together with the two work-holding devices, or with the two track guides, on a common bedplate or on a common frame, so that the stability of both the machine guide and the work-holding devices is further improved.

In summary, it may be stated that the invention provides a machine tool and also a method for machining at least two workpieces with increased capacity.

The invention claimed is:

1. A machine tool, comprising:
   a machine tower which is linearly displaceable along a longitudinal direction of a straight track;
   a tool head which is arranged on the machine tower and comprises a tool for machining workpieces; and
   at least two work-holding devices for at least two workpieces, wherein
   a first of the work-holding devices is arranged on a first lateral side of the straight track,
   a second of the work-holding devices is arranged on a second lateral side of the straight track, which lies opposite the first lateral side, and
   the tool head is mounted so as to be able to be alternatively pivoted relative to the straight track between a position where the tool can machine a first of the at least two workpieces in the first work-holding device and a position where the tool can machine a second of the at least two workpieces in the second work-holding device.

2. The machine tool as claimed in claim 1, wherein the machine tower is rotatable by at least 180° about a vertical axis to perform the pivoting of the tool head.

3. The machine tool as claimed in claim 2, wherein the tool head is movable along three cartesian axes.

4. The machine tool as claimed in claim 2, characterized in that wherein the machine tower (2; 102) is mounted in a free-standing manner on a guide (14; 114) which corresponds to the straight track.

5. The machine tool as claimed in claim 2, wherein the machine tower is mounted between a lower guide which corresponds to the straight track and an upper counterguide which extends parallel to the lower guide.

6. The machine tool as claimed in claim 2, wherein the machine tower is mounted on a rotary table to achieve the rotation about the vertical axis.

7. The machine tool as claimed in claim 1, wherein the tool head is pivotable by at least 180° about a horizontal axis to perform the pivoting.

8. The machine tool as claimed in claim 7, characterized in that wherein the tool head (4; 104) has is movable along three cartesian axes kinematics, and in that it is in particular arranged rotatably about three rotational axes perpendicular to one another.

9. The machine tool as claimed in claim 7, wherein the machine tower is mounted in a free-standing manner on a guide which corresponds to the straight track.

10. The machine tool as claimed in claim 7, wherein the machine tower is mounted between a lower guide which corresponds to the straight track and an upper counterguide which extends parallel to the lower guide.

11. The machine tool as claimed in claim 1, wherein the tool head is movable along three cartesian axes.

12. The machine tool as claimed in claim 11, wherein the machine tower is mounted in a free-standing manner on a guide which corresponds to the straight track.

13. The machine tool as claimed in claim 11, wherein the machine tower is mounted between a lower guide which corresponds to the straight track and an upper counterguide which extends parallel to the lower guide.

14. The machine tool as claimed in claim 1, wherein the machine tower is mounted in a free-standing manner on a guide which corresponds to the straight track.

15. The machine tool as claimed in claim 1, wherein the machine tower is mounted between a lower guide which corresponds to the straight track and an upper counterguide which extends parallel to the lower guide.

16. A method for machining at least two workpieces with a machine tool as claimed in claim 1, comprising:
   clamping the first of the at least two workpieces into the first work-holding device on a first side of the straight track;
   positioning the tool head of the machine tool so that the first workpiece can be machined;
   machining the first workpiece;
   at the same time that the first workpiece is being machined, clamping the second of the at least two workpieces into the second work-holding device on a second side of the straight track, which lies opposite the first side;
   )after completion of the machining of the first workpiece, positioning the tool head so that the second workpiece can be machined; and
   machining the second workpiece.

17. The method as claimed in claim 16, wherein, for the positioning of the tool head, the machine tower of the machine tool is rotated by 180° about a vertical axis.

18. The method as claimed in claim 16, wherein, for the positioning of the tool head, the tool head is pivoted by 180° about a horizontal axis.

* * * * *